(12) United States Patent
Aas et al.

(10) Patent No.: US 10,025,423 B2
(45) Date of Patent: Jul. 17, 2018

(54) DRIVEN SHIELD CONTROL

(71) Applicant: Atmel Corporation, San Jose, CA (US)

(72) Inventors: Arne Aas, Trondheim (NO); Torbjorn Viksand, Trondheim (NO)

(73) Assignee: Atmel Corporation, San Jose, CA (US)

( * ) Notice: Subject to any disclaimer, the term of this patent is extended or adjusted under 35 U.S.C. 154(b) by 0 days.

(21) Appl. No.: 15/138,152

(22) Filed: Apr. 25, 2016

(65) Prior Publication Data

US 2017/0308219 A1 Oct. 26, 2017

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 2203/04107* (2013.01)

(58) Field of Classification Search
CPC ......... G06F 3/0416; G06F 2203/04107; G06F 3/05; G06F 17/5022; G06F 1/261; G06F 11/263; G06F 17/5027; G06F 17/5036; G06F 17/5063; G06F 1/022; G06F 13/00; G06F 13/102; G06F 13/105; G06F 9/52; G06F 9/4881; G06F 15/16; G06F 2101/00; H03M 1/00; H03M 1/12; H03K 17/00; G11C 27/02; G05B 2219/13031; G05B 2219/36168; G02F 7/00

USPC ........................................................ 345/173
See application file for complete search history.

(56) References Cited

U.S. PATENT DOCUMENTS

| | | | |
|---|---|---|---|
| 8,698,658 B1* | 4/2014 | Ghatak ............... | H03M 1/0607 341/118 |
| 2007/0139243 A1* | 6/2007 | Chowdhury .......... | H03M 1/462 341/155 |
| 2014/0168000 A1* | 6/2014 | Lemkin ............... | H03M 1/1245 341/172 |
| 2015/0145569 A1* | 5/2015 | Perrott ................... | H03L 7/093 327/157 |
| 2016/0105194 A1* | 4/2016 | Kumbaranthodiyil | H03M 1/1245 341/122 |
| 2016/0156366 A1* | 6/2016 | Lamesch ............... | H03M 1/201 324/679 |

\* cited by examiner

*Primary Examiner* — Vinh T Lam
(74) *Attorney, Agent, or Firm* — Fish & Richardson P.C.

(57) ABSTRACT

In an embodiment, a circuit comprises: an analog driver operable to drive a sensor voltage on a capacitive sensor; a digital driver; a shield drive control coupled to the analog driver and the digital driver, the shield drive control operable to: during a one or more phases of a capacitive measurement of the capacitive sensor, disable the analog driver and enable the digital driver to drive a driven shield; and during one or more other phases of a capacitive measurement of the capacitive sensor, disable the digital driver and enable the analog driver to drive the driven shield with a driven shield voltage that replicates the sensor voltage.

13 Claims, 2 Drawing Sheets

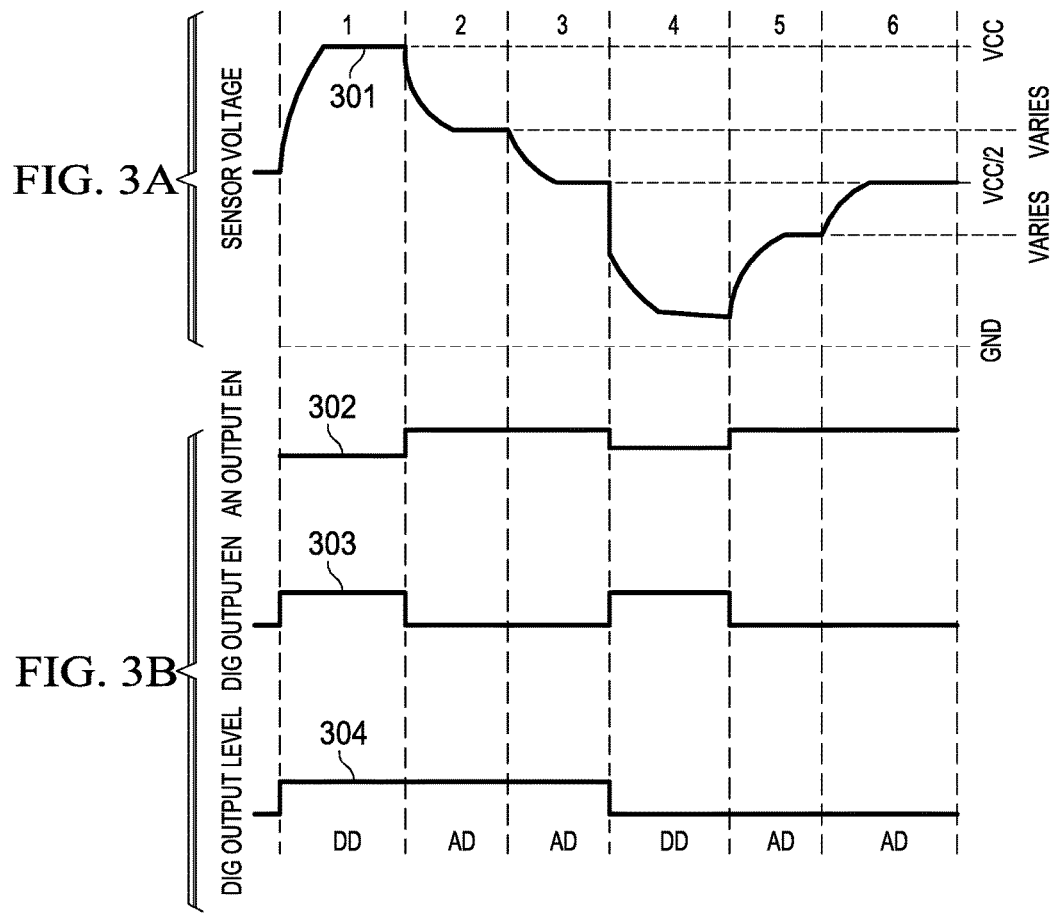
FIG. 3A
FIG. 3B
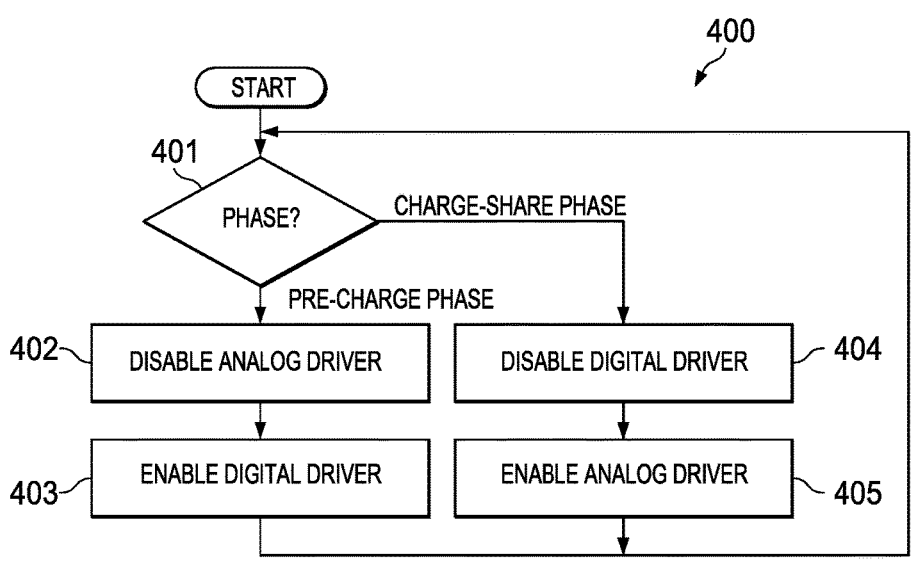
FIG. 4

DRIVEN SHIELD CONTROL

TECHNICAL FIELD

The subject matter of this disclosure relates generally to driven shield control.

BACKGROUND

A capacitive touch screen allows a user to interact with an electronic device without using a mouse or track pad. When an object (e.g., a user's finger or a stylus) touches or comes within proximity of the surface of a capacitive touch screen, a change in capacitance occurs within the touchscreen at the location of the touch or proximity. A touch-sensor controller processes the change in capacitance to determine whether an object is touching or in proximity to the touch sensor or to determine the location of the touch or proximity with respect to the touch sensor.

SUMMARY

In an embodiment, a circuit comprises: an analog driver operable to drive a sensor voltage on a capacitive sensor; a digital driver; a shield drive control coupled to the analog driver and the digital driver, the shield drive control operable to: during a one or more phases of a capacitive measurement of the capacitive sensor, disable the analog driver and enable the digital driver to drive a driven shield; and during one or more other phases of a capacitive measurement of the capacitive sensor, disable the digital driver and enable the analog driver to drive the driven shield with a driven shield voltage that replicates the sensor voltage.

In another embodiment, a method comprises: providing a sensor voltage to a capacitive sensor; during one or more phases of a capacitive measurement of the capacitive sensor, enable a digital driver to drive a driven shield; and during one or more other phases of the capacitive measurement, disable the digital driver and enable the analog driver to drive the driven shield with a driven shield voltage that replicates the sensor voltage.

In an embodiment, a touch measurement system comprises: a touch sensor; a driven shield; sense drive circuit coupled to the touch sensor and operable to generate a sensor voltage on the touch sensor; sense circuit coupled to the touch sensor and operable for measuring capacitance at the touch sensor; a controller comprising: an analog driver; a digital driver; a shield drive control circuit coupled to the analog driver and the digital driver, the drive control circuit operable to: during one or more phases of a capacitive measurement of the touch sensor, enable the digital driver to drive the driven shield; and during one or more other phases of the capacitive measurement of the touch sensor, disable the digital driver and enable the analog driver to drive the driven shield with a driven shield voltage that replicates the sensor voltage.

BRIEF DESCRIPTION OF THE DRAWINGS

FIGS. 3A and 3B include example waveforms illustrating operation of a hybrid mode driven shield for capacitive touch applications, according to an embodiment.

FIG. 4 is a flow diagram of an example process performed by a hybrid mode driven shield for capacitive touch applications, according to an embodiment.

DETAILED DESCRIPTION

Example System

For capacitive touch applications it is often useful to have an electrode ("driven shield") positioned behind the touch electrode that is driven to the same potential as the touch electrode by using an external or internal amplifier. The driven shield increases performance of the touch system in the presence of moisture and also provides noise shielding, improved touch measurement sensitivity and proximity detection. A driven shield is a means of shielding a sensor (e.g., touch electrode) from being enabled from any direction except an intended sensing area. In an embodiment, a replica of the sensor signal is applied through an analog buffer (e.g., an operational amplifier) to a pour at the reverse side of the sensor. This will deflect the capacitive field from the back of the sensor towards the front thereby enhancing the signal strength and range of the sensor to the front while blocking any sensing to the rear of the sensor. The operational amplifier should have a fast slew rate and a rail-to-rail input and output so that the driven shield voltage can accurately replicate the actual sensor signal and provide the desired shielding effect. Operation amplifiers with fast slew rate and rail-to-rail input and output are expensive in terms of silicon area. As disclosed below, a hybrid circuit topology that uses a digital driver for one or more phases (e.g., a pre-charge phase) and an analog driver to provide a driven shield voltage that replicates the sensor voltage during one or more other phases (e.g., a charge-share phase) of a capacitive touch measurement allows for use of a less expensive operational amplifier to implement the analog driver.

Example Circuit

Figure 1:
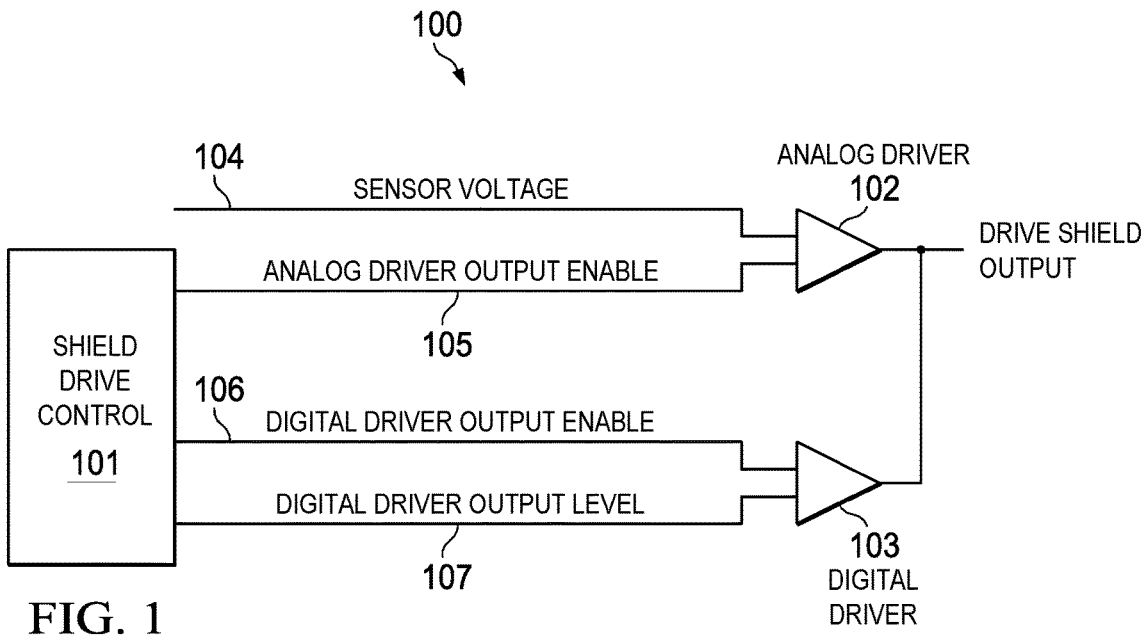
FIG. 1 is a conceptual block diagram illustrating an example hybrid mode driven shield for capacitive touch applications, according to an embodiment.

FIG. 1 is a conceptual block diagram illustrating an example hybrid mode driven shield circuit 100 for capacitive touch applications, according to an embodiment. Circuit 100 includes shield drive control 101, analog driver 102 (e.g., an operational amplifier, unity gain buffer amplifier, voltage follower) and digital driver 103 (e.g., a PAD driver). Analog driver 102 receives as inputs sensor voltage 104 and analog driver output enable signal 105. Digital driver 103 receives as inputs digital driver output enable signal 106 and digital driver output level 107. Shield drive control 101 includes circuitry operable for generating the analog driver enable signal 105, digital driver output enable signal 106 and digital driver output level 107. In some implementations, shield drive control 101 includes circuitry operable for decoding signals used for sensor measurements to generate output enable signals 105, 106 for enabling and disabling digital and analog drivers 102, 103.

During a touch acquisition stage, digital driver 103 pre-charges the driven shield to a rail voltage (VCC) or ground (GND) to match the pre-charging of the touch electrode. In an embodiment, digital driver 103 can include one or more logic inverters with high current drive capability and an output enable function (e.g., a tristate device). During a charge-share phase, following the pre-charge phase, digital driver 103 is disabled and analog driver 102 is enabled and operable to provide a driven shield voltage that replicates the voltage on the touch electrode (e.g., VCC/2). Analog driver 102 can be a low cost operational amplifier analog buffer or voltage follower. Accordingly, circuit 100 is an example of a hybrid mode driven shield circuit that uses a less expensive operational amplifier and digital PAD driver (e.g., logic inverter) in different phases of a capacitive touch measurement to generate a driven shield voltage that closely replicates the sensor voltage.

Figure 2:
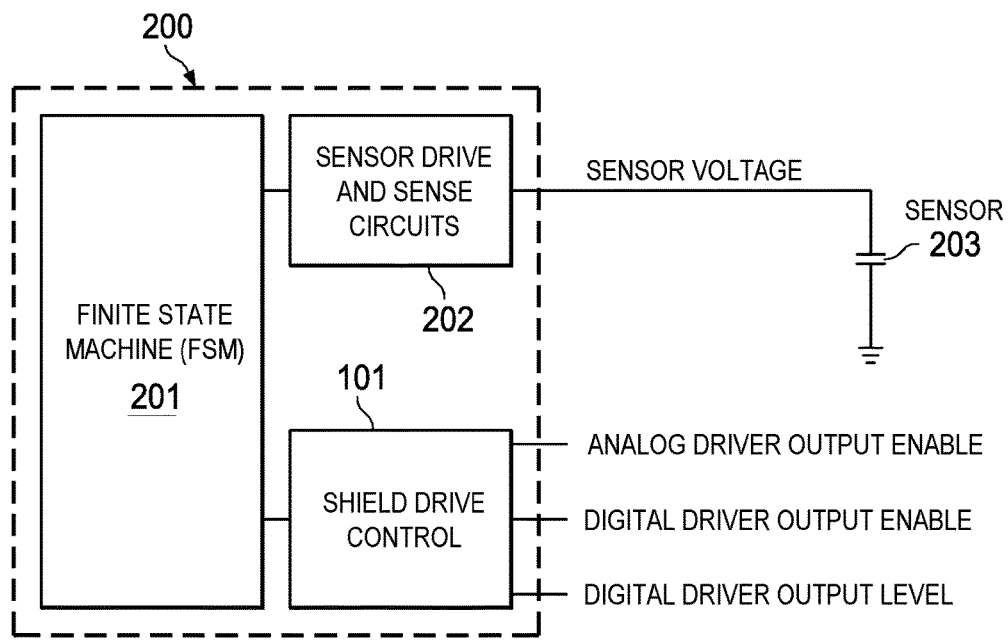
FIG. 2 is a conceptual block diagram of an example touch measurement system implementing a hybrid mode driven shield for capacitive touch applications, according to an embodiment.

FIG. 2 is a schematic diagram of an example touch measurement system implementing a hybrid mode driven shield for capacitive touch applications, according to an embodiment. System 200 includes finite state machine (FSM) 201, sensor drive/sense circuitry 202, shield drive control circuit 101 and capacitive sensor 203. FSM 201 generates control signals for controlling sensor drive/sense circuitry 202 and shield drive control 101. In an embodiment, FSM 201 controls the various processes of a touch measurement through sensor drive and sense circuits 202 and shield drive control 101. Sensor drive/sense circuitry 202 drives sensor 203 (e.g., a touch electrode) and measures capacitance of sensor 203. Shield drive control 101 generates various output enable and level signals as described in reference to FIG. 3B.

FIGS. 3A and 3B include example waveforms illustrating operation of a hybrid mode driven shield, according to an embodiment. In this example, a touch measurement includes 6 phases indicated as phases 1-6 on the top of FIG. 3A, where each phase is demarcated from other phases with vertical dashed lines. FIG. 3A illustrates sensor voltage waveform 301 as it transitions through phases 1-6. FIG. 3B illustrates waveforms 302, 303, 304 for analog output enable, digital output enable and digital output level signals, respectively. At the bottom of FIG. 3B are the symbols "DD" for digital driver and "AD" for analog driver. These symbols indicate, for each phase, whether the analog driver 102 is enabled or the digital driver 103 is enabled.

In phase 1, the sensor is charged to VCC. Then in phase 2, the sensor voltage is reduced to an intermediate level. Note that the intermediate level voltage is not known in phase 2 prior to the capacitive measurement. In phase 3, the sensor voltage reduces to VCC/2. Phases 4-6 are the same as phases 1-3 but the sensor voltage waveform 301 is "inverted" with respect to the mid line representing VCC/2. In phases 2 and 5, the sensor voltage is unknown prior to the capacitive measurement, so a simplistic driver approach which drives the driven shield to a predetermined level with, for example, a programmable Resistor-Capacitor (RC) slope cannot be used, and an analog driver (e.g., an operational amplifier) is needed. Since only the analog driver can provide a driven shield voltage that replicates the analog sensor voltage, the analog driver is used in phases 2, 3, 5 and 6. The digital driver, however, is better suited for use in phases 1 and 4 because the digital driver is better at reaching the rails (VCC, GND) than the analog driver. Additionally, in phases 1 and 4 dynamic replicating the sensor voltage is not as important as it will not affect measurement accuracy (pre-charge phase).

An operational amplifier that can generate an output that reaches the rails is expensive and uses more power than an operational amplifier that does not reach the rails. Moreover, such expensive operational amplifiers are not as good as a digital driver at reaching the rails. The primary goal is to reach VCC or GND at the end of the phases. For phases 2, 3, 5 and 6 it is desired for the driven shield voltage to dynamically replicate the sensor voltage such that the driven shield voltage is as close to the sensor voltage as possible for every instant of time. The hybrid mode driven shield circuit 100 shown in FIG. 1 uses both a digital driver and an analog driver in different phases of a capacitive measurement to leverage the inherent advantages each driver provides.

Referring to the output enable and level waveforms shown in FIG. 3, in phase 1, digital output level waveform 304 is high, digital output enable waveform 303 is high and analog output enable waveform 302 is low. This results in disabling of analog driver 102 and enabling of digital driver 103. In phase 2, digital output enable waveform 303 is low and analog output enable waveform 302 is high. Note that digital output level 304 is "don't care" since digital output enable waveform 303 is low. This results in disabling of digital driver 103 and enabling of analog driver 102. In phase 3, digital output level waveform 304 is high, digital output enable waveform 303 is low and analog output enable 302 is high. This results in analog driver 102 remaining enabled and digital driver 103 remaining in disabled.

In phase 4, digital output level waveform 304 is low, digital output enable waveform 303 is high and analog output enable is low. This results in disabling of analog driver 102 and enabling of digital driver 103. In phase 5, digital output level waveform 304 is low, digital output enable waveform 303 is low and analog output enable waveform 302 is high. This results in disabling of digital driver 103 and enabling of analog driver 102. In phase 6, digital output level waveform 304 is low, digital output enable waveform 303 is low and analog output enable waveform 302 is high. This results in analog driver 102 remaining enabled and digital driver 103 remaining disabled.

Example Process

FIG. 4 is a flow diagram of an example process 400 performed by a hybrid mode driven shield for capacitive touch applications, according to an embodiment. In an embodiment, process 400 begins by determining the beginning of a charge a pre-charge phase of a capacitive measurement (401). During the pre-charge phase the analog driver is disabled (402) and the digital driver is enabled (403). Disabling the analog driver can include disconnecting the analog driver from the driven shield. During a charge-share phase, the digital driver is disabled (404) and the analog driver is enabled (405). Disabling the digital driver can include disconnecting the digital driver from the driven shield. Enabling the digital driver can include connecting the digital driver to the driven shield.

While this document contains many specific implementation details, these should not be construed as limitations on the scope of what may be claimed but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

What is claimed is:

1. A circuit comprising:
an analog driver operable to drive a sensor voltage on a capacitive sensor;
a digital driver;
a shield drive control circuit coupled to the analog driver and the digital driver, the shield drive control operable to:
during a one or more phases of a capacitive measurement of the capacitive sensor, disable the analog driver and enable the digital driver to drive a driven shield; and
during one or more other phases of the capacitive measurement of the capacitive sensor, disable the digital driver and enable the analog driver to drive the driven shield with a driven shield voltage that replicates the sensor voltage.

2. The circuit of claim 1, wherein the analog driver is an analog buffer that includes an input for receiving an output enable signal from the shield drive control circuit.

3. The circuit of claim 1, wherein enabling the digital driver or analog driver includes electrically coupling the digital driver or analog driver, respectively, to the driven shield.

4. The circuit of claim 1, wherein the shield drive control circuit is operable to generate one or more signals for enabling and disabling the digital and analog drivers based on one or more signals from a finite state machine.

5. The circuit of claim 1, wherein the shield drive control circuit is operable to decode one or more signals applicable to capacitive measurements so as to generate one or more output enable signals for enabling and disabling the digital and analog drivers.

6. A method comprising:
providing a sensor voltage to a capacitive sensor;
during one or more phases of a capacitive measurement of the capacitive sensor, enable a digital driver to drive a driven shield; and
during one or more other phases of the capacitive measurement, disable the digital driver and enable an analog driver to drive the driven shield with a driven shield voltage that replicates the sensor voltage.

7. The method of claim 6, wherein the analog driver includes an input for receiving an output enable signal from a shield drive control circuit.

8. The method of claim 6, wherein enabling the digital driver or analog driver includes electrically coupling the digital driver or analog driver, respectively, to the driven shield.

9. A touch measurement system comprising:
a touch sensor;
a driven shield;
sense drive circuit coupled to the touch sensor and operable to generate a sensor voltage on the touch sensor;
sense circuit coupled to the touch sensor and operable for measuring capacitance at the touch sensor;
a controller comprising:
an analog driver;
a digital driver;
a shield drive control circuit coupled to the analog driver and the digital driver, the drive control circuit operable to:
during one or more phases of a capacitive measurement of the touch sensor, enable the digital driver to drive the driven shield; and
during one or more other phases of the capacitive measurement of the touch sensor, disable the digital driver and enable the analog driver to drive the driven shield with a driven shield voltage that replicates the sensor voltage.

10. The system of claim 9, wherein the analog driver is an analog buffer that includes an input for receiving an output enable signal from the shield drive control circuit.

11. The system of claim 9, wherein enabling the digital driver or analog driver includes electrically coupling the digital driver or analog driver, respectively, to the driven shield.

12. The system of claim 9, wherein the shield drive control circuit is operable to generate one or more signals for enabling and disabling the digital and analog drivers based on one or more signals from a finite state machine.

13. The system of claim 9, wherein the shield drive control circuit is operable to decode one or more signals applicable to capacitive measurements so as to generate one or more output enable signals for enabling and disabling the digital and analog drivers.

* * * * *